(12) United States Patent
Yamazaki et al.

(10) Patent No.: US 7,268,751 B2
(45) Date of Patent: Sep. 11, 2007

(54) IMAGE DISPLAY APPARATUS

(75) Inventors: Tatsuro Yamazaki, Tokyo (JP); Naoto Abe, Tokyo (JP); Muneki Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 10/756,451

(22) Filed: Jan. 14, 2004

(65) Prior Publication Data

US 2004/0160406 A1 Aug. 19, 2004

(30) Foreign Application Priority Data

Jan. 17, 2003 (JP) ............................. 2003-009354

(51) Int. Cl.
G09G 3/30 (2006.01)

(52) U.S. Cl. ....................... 345/76; 345/74.1

(58) Field of Classification Search ................ 345/76, 345/77, 87, 98–100, 204, 690–693, 73, 74.1, 345/75.2, 82; 315/169.3
See application file for complete search history.

(56) References Cited

U.S. PATENT DOCUMENTS

| | | | |
|---|---|---|---|
| 4,486,749 A | 12/1984 | Kishino et al. | 340/772 |
| 4,935,731 A | 6/1990 | Takebe et al. | 30/772 |
| 5,192,945 A | 3/1993 | Kusada | 340/784 |
| 5,455,597 A | 10/1995 | Nakamura et al. | 345/75 |
| 5,659,329 A | 8/1997 | Yamanobe et al. | 345/74 |
| 5,818,403 A | 10/1998 | Nakamura et al. | 345/74 |
| 5,943,029 A | 8/1999 | Ross | 345/11 |
| 6,094,243 A * | 7/2000 | Yasunishi | 349/33 |
| 6,239,779 B1 * | 5/2001 | Furuya et al. | 345/87 |
| 6,466,192 B2 * | 10/2002 | Imamura | 345/98 |
| 6,483,497 B1 * | 11/2002 | Iino et al. | 345/100 |
| 6,515,641 B1 | 2/2003 | Sagano et al. | 345/76 |
| 6,552,702 B1 | 4/2003 | Abe et al. | 345/75.2 |
| 6,603,450 B1 | 8/2003 | Yamazaki et al. | 345/75.2 |
| 7,161,576 B2 * | 1/2007 | Kawabe et al. | 345/99 |
| 2002/0154101 A1 | 10/2002 | Abe et al. | 345/204 |
| 2003/0011545 A1 | 1/2003 | Sagano et al. | 345/76 |
| 2003/0016195 A1 | 1/2003 | Sagano et al. | 345/75.2 |
| 2003/0122759 A1 | 7/2003 | Abe et al. | 345/89 |

FOREIGN PATENT DOCUMENTS

| | | |
|---|---|---|
| EP | 0 747 925 | 12/1996 |
| EP | 1 005 011 | 5/2000 |
| EP | 1 244 091 | 9/2002 |

(Continued)

*Primary Examiner*—Amr A. Awad
*Assistant Examiner*—Tom V Sheng
(74) *Attorney, Agent, or Firm*—Fitzpatrick, Cella, Harper & Scinto

(57) ABSTRACT

A scanning wiring driving unit for generating a signal of a frequency Fb applies a scanning signal to a plurality of scanning wirings which are a part of a plurality of scanning wirings. In a next selection period following a predetermined selection period, by shifting by a portion of the scanning wiring to which the scanning signal was applied in a previous stage, a scanning signal is applied to a plurality of scanning wirings. Further, in any one of the selection periods, a scanning signal is applied to a plurality of scanning wirings simultaneously, and n pieces of scanning wirings are sequentially scanned by use of a frequency of n X Fb and below.

9 Claims, 7 Drawing Sheets

FOREIGN PATENT DOCUMENTS

| | | |
|---|---|---|
| JP | 6-342636 | 12/1994 |
| JP | 8-50462 | 2/1996 |
| JP | 8-212944 | 8/1996 |
| JP | 11-259053 | 9/1999 |
| JP | 2000-250473 | 9/2000 |
| JP | 2003-140624 | 5/2003 |

* cited by examiner

IMAGE DISPLAY APPARATUS

BACKGROUND OF THE INVENTION

1. Field of the Invention

This invention relates to an image display apparatus.

2. Description of the Related Art

In the past, as an example of a television receiver and a display device for receiving a television signal, a display signal from a computer and so on and for carrying out image display, by use of a plurality of electron-emitting devices which were interconnected as a matrix wiring and a display panel which is configured by a fluorescent screen for emitting light when it received electron irradiation thereof, such structures as in Patent Document 1 (JP-A-6-342636 gazette) and Patent Document 2(JP-A-8-212944 gazette) have been known.

An image display apparatus which was described in these documents is configured such that a plurality of surface conduction electron-emitting devices are connected in a matrix shape by use of a plurality of scanning wirings and a plurality of modulation wirings.

And, image display of one frame is realized, by applying a selection electric potential to one scanning wiring and applying a drive electric potential to respective plural modulation wirings, by driving the electron-emitting device with an electric potential difference (hereinafter, referred to as a drive voltage) of the selection electric potential and the drive electric potential so as to carry out display of 1 line portion, and further, by sequentially switching the scanning wiring to be selected by a predetermined scanning frequency so as to carry out scanning in a vertical direction.

Now, in an image display apparatus which was described in Patent Document 1, as shown in FIG. 6, image display of one frame is carried out. Here, in order to make an explanation easy, pixels of a display panel are connected by matrix wirings of 8 column×6 rows, and one frame period is, as described later, divided into eight scanning periods, so as to carry out image display.

That is, as shown in FIG. 6, luminance data for determining an amount of light emission with respect to each pixel divides one frame period into eight scanning periods, and with respect to each scanning period, data for one scanning is sent in a manner of pixel interleave. In passing, a panel is of six rows, but there are frame image signals for seven rows, and a seventh image signal is made to be of non-display.

This luminance data is held by a modulation wiring drive circuit which was provided with respect to each modulation wiring, and outputs a voltage pulse having an effective electric potential in proportion to size of luminance data, with respect to each scanning period, and with respect to each modulation wiring, for driving the modulation wiring. Also, here, as to selection scanning of scanning wirings, the scanning will be carried out as follows.

That is, a first scanning period is assigned to a non-display period, and no selection electric potential is given to any scanning. In a second scanning period, the selection electric potential is given to a first row scanning wiring, and an opportunity of light emission is given to a pixel for first scanning. In a third scanning period, the selection electric potential is given to a second row scanning wiring, and the opportunity of light emission is given to a pixel for second scanning. In a fourth scanning period, the selection electric potential is given to a third row scanning wiring, and the opportunity of light emission is given to a pixel for third scanning. In a fifth scanning period, the selection electric potential is given to a fourth row scanning wiring, and the opportunity of light emission is given to a pixel for fourth scanning. In a sixth scanning period, the selection electric potential is given to a fifth row scanning wiring, and the opportunity of light emission is given to a pixel for fifth scanning. In a seventh scanning period, the selection electric potential is given to a sixth row scanning wiring, and the opportunity of light emission is given to a pixel for sixth scanning. An eighth scanning period is assigned to a non-display period, and no selection electric potential is given to any scanning.

Also, a technology which was described in Patent Document 2 is such a technology that a display panel comprising a plurality of electron-emitting devices which was interconnected as a matrix wiring is divided into two above and below, and, independently for one for an upper half area and one for a lower half area, a modulation wiring modulation circuit and a scanning wiring selection circuit are provided.

According to this technology, it becomes possible to expand scanning selection time two times, and a luminance margin due to this is parted to drive current reduction, so that it is possible to reduce luminance lowering due to voltage drop which is generated by a drive current flowing through the scanning wiring.

Also, such a structure as described in Patent Document 3 (JP-A-2000-250473) has been known. A technology which was described in this Patent Document 3 is one for carrying out high frame rate driving for improving light emission efficiency of a fluorescent material. This technology will be described with reference to FIG. 7. In passing, in order to make understanding easy, pixels of a display panel 100 are connected by matrix wirings of 8 columns×6 rows.

That is, as shown in FIG. 7, the technology which was disclosed in Patent Document 3 is such a drive display method that, when received is an image signal which corresponds to six scanning lines in one frame period (60 Hz) as an input signal, one frame period is divided into two sub-frame periods (120 Hz), and display is carried out twice repeatedly in a half display period. By this, since it is possible to shorten time for exciting the fluorescent material consecutively, it becomes possible to improve light emission efficiency. In passing, such a structure as described in Patent Document 4(JP-A-8-50462 gazette) has been known.

Also, in recent years, a television signal format has been diversified. For example, in BS digital broadcasting, an operation with a diversified range of formats is carried out. On one hand, in resolution of a display panel at the side of an image display apparatus for receiving suchlike broadcasting, various combinations are conceivable.

That is, in case of receiving a TV signal which was based upon a high resolution format, by use of a panel with the number of pixels which is in conformity with broadcasting with low resolution, there is a method for carrying out image display in which resolution conversion is carried out so as to be in conformity with the number of pixels of a low resolution panel.

On the other hand, in case of receiving a TV signal of a low resolution format, by use of a panel with the number of pixels which is in conformity with broadcasting with high resolution, there is a method for carrying out image display in which resolution conversion is carried out so as to be in conformity with high resolution.

OBJECT AND SUMMARY OF THE INVENTION

An invention which relates to this application aims to realize preferred image display. Further, specifically, it is possible to cite realizing image display with less flicker disturbance over suppressing increase of a drive frequency, as one of problems which the invention of this application can solve.

One of inventions of an image display apparatus which can realize preferred image display is configured as follows.

That is, it is an image display apparatus which has a plurality of display devices, a plurality of scanning wirings which constitute a matrix wiring for driving the plurality of display devices, a plurality of modulation wirings which constitute the matrix wiring for driving the plurality of display devices, a scanning circuit which is a circuit for applying a scanning signal to the scanning wirings and which sequentially switches the scanning wirings to which the scanning signal is applied, an image signal generation circuit for generating an image signal for carrying out screen display with a frequency Fb[Hz] as a display refresh rate, based on an input image signal having a predetermined refresh rate Fa[Hz], wherein the frequency Fb[Hz] is higher than Fa[Hz], and a modulation circuit for applying a modulation signal which is based upon the image signal to the display device which is connected to the scanning wiring to which the scanning signal was applied, through the modulation wiring, and wherein, the scanning signal is applied to the plurality of scanning wirings in the one selection period, in such a manner that such a frequency for switching the scanning wiring to which the scanning circuit applied the scanning signal with respect to each selection period becomes smaller than n/((1/Fb)−Tb), assuming that n (n≧2) is the number of the scanning wirings for scanning, Tb is a non-display period in one display refresh period.

In this invention, typically, the image display apparatus further has a scanning condition determination unit, wherein the scanning circuit is configured in such a manner that a scanning method for carrying out image display on the basis of an instruction signal from the scanning condition determination unit can be changed.

In this invention, preferably, the image display apparatus, wherein the image signal which the image signal generation circuit supplies to the modulation circuit in response to the instruction signal from the scanning condition determination unit is generated so as to be in conformity with a scanning method which was determined by the scanning condition determination unit.

In this invention, the image display apparatus further has a circuit for generating a display luminance desired value, and a circuit for determining, on the basis of the display luminance desired value, the number of sub-frames when the scanning condition determination unit divides one frame period into a plurality of periods, the number of scanning wirings to be selected in one scanning unit of respective sub-frame periods, and a scanning region of each scanning unit.

In this invention, preferably, the image display apparatus further has an input signal discrimination unit for discriminating a type of an input image signal, a circuit for generating a display luminance desired value, and a circuit for determining, on the basis of a discrimination signal from the input signal discrimination unit and the display luminance desired value, the number of sub-frames when the scanning condition determination unit divides one frame period into a plurality of periods, the number of scanning wirings to be selected in one scanning unit of each sub-frame period, and a scanning position of each scanning unit.

In this invention, typically, the image display apparatus further has a circuit for varying a scanning electric potential to be applied to the scanning wiring, and a circuit for carrying out display luminance control, by varying at least the scanning electric potential.

In this invention, in a structure for carrying out screen display based on an input image signal having a predetermined refresh rate Fa[Hz], by use of a higher frequency Fb[Hz] than Fa[Hz] as a display refresh rate, in order to realize such a fact that a frequency for switching the scanning wiring to which the scanning circuit applies the scanning signal is made to be smaller than n/((1/Fb)−Tb), assuming that Tb which is the number of the scanning wirings for scanning n (n≧2) is set as a non-display period in one display refresh period, the image display apparatus has such a structure that, assuming that at least one scanning wiring to which the scanning signal is applied by the scanning circuit in a previous selection period in successive two selection periods is set as a previous scanning wiring and at least one scanning wiring to which the scanning signal is applied by the scanning circuit in a rear selection period in successive two selection periods is set as a rear scanning wiring, the scanning is carried out in such a manner that at least one scanning wiring is disposed between a previous scanning wiring which is most apart from the subsequent scanning wiring out of at least one previous scanning wiring and a subsequent scanning wiring which is the closest to the previous scanning wiring out of at least one of the subsequent scanning wiring. In passing, this scanning wiring may be one to which the scanning signal is applied in a previous selection period of the above-described one.

This invention is effective particularly in case of receiving low resolution broadcasting in an image display apparatus which is used in a high resolution display panel, but is one which includes an invention which relates not only to an image display apparatus but also to a drive apparatus and a drive method of an electron-emitting device.

DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
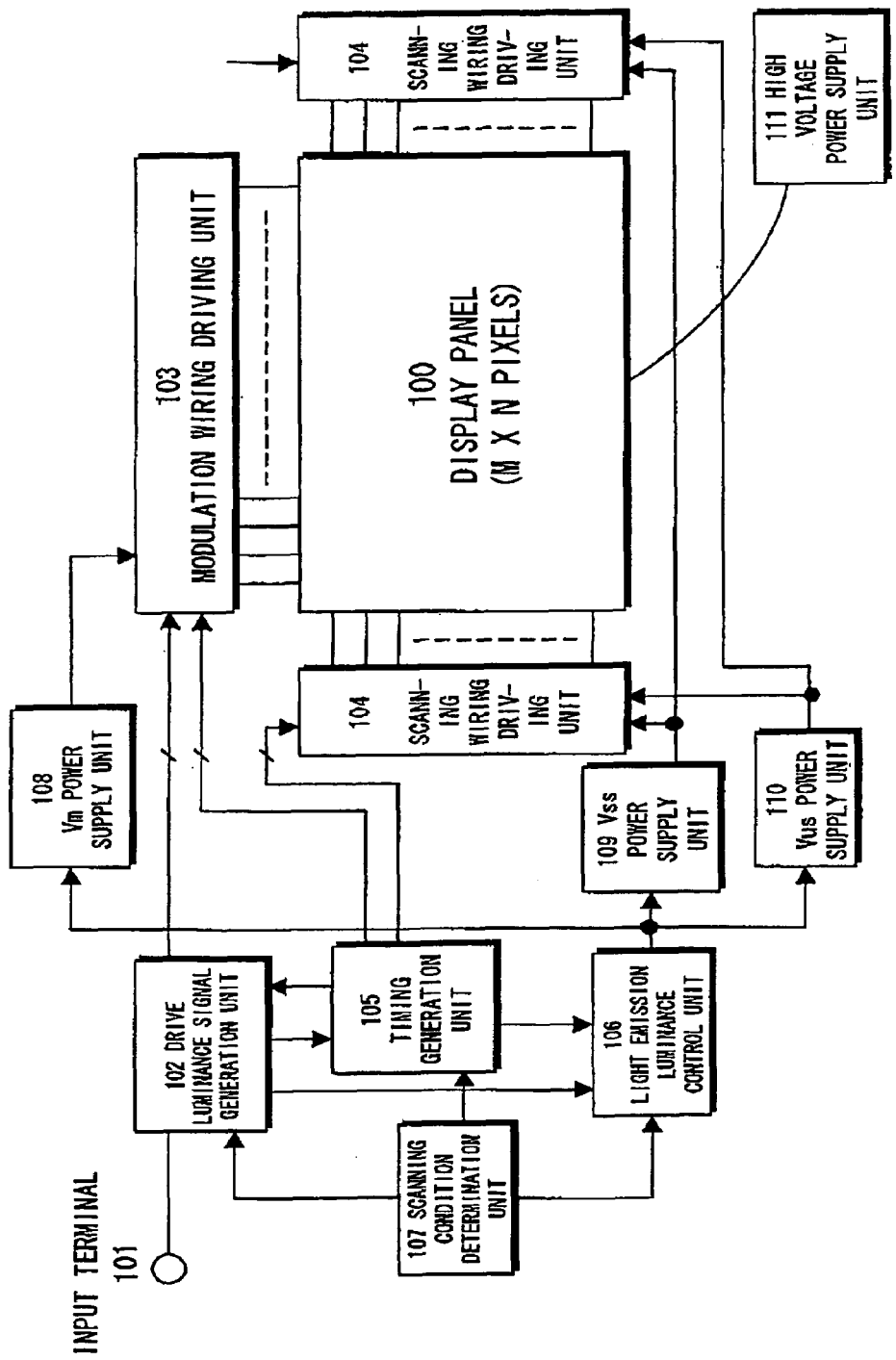
FIG. 1 is a block diagram showing an image display apparatus according to a first mode for carrying out this invention.

Hereinafter, modes for carrying out this invention, i.e., embodiments of this invention will be described with reference to the drawings. In passing, this invention is not limited to the following embodiments, but is one which includes technical ideas which were selectively combined from technical ideas which are shown above and below.

Also, in the following embodiments, an image display apparatus which used a surface conduction electron-emitting device is cited as an example, but this invention is preferably applicable to an image display device and so on which used a cold cathode electron-emitting device such as a FE type device, a MIM type device, an electroluminescence device (EL device) and so on.

Also, in an invention which relates to this application, if an input image signal is a progressive signal, a frame frequency thereof is a refresh rate of the input image signal, and if the input image signal is an interlace signal, a field frequency thereof is a refresh rate of the input image signal.

Also, a display refresh rate means a repetition frequency when a plurality of images are displayed sequentially (whether display of each image is scanning which includes at least interlaced scanning or scanning which does not include interlaced scanning).

Also, one display refresh period means an inverse number of the display refresh rate. A non-display period in one display refresh period means a period determined by subtracting from the one display refresh period a period from time when a selection period for carrying out application of the scanning signal to a scanning wiring to which the scanning signal is applied at the first in this one display refresh period is started until time when a selection period for carrying out application of the scanning signal to a scanning wiring to which the scanning signal is applied at the last in this one display refresh period is completed. The non-display period in this one display refresh period may be 0.

In passing, the selection period for carrying out application of the scanning signal to the scanning wiring has such a property that a completion point of one selection period and a start point of a subsequent selection period become simultaneous. It is possible to apply the scanning signal to the scanning wiring in one selection period.

Also, it is possible to apply the scanning signal by full use of the selection period, but it is also possible to dispose such time that the scanning signal is not applied in the selection period. For example, during a period from time when the selection period is started and until time when an actual scanning signal is applied, or during a period from time when application of the scanning signal is completed until time when the selection period is completed, it is possible to dispose predetermined time.

Also, the selection period can be defined as one that transition of this selection period is synchronous with transition from such a period that a modulation signal which is outputted on the basis of certain data can be applied to such a period that a modulation signal which is outputted on the basis of other data can be applied. It is also possible to apply the modulation signal by full use of the selection period, but it is also possible to dispose such time that the modulation signal is not applied in the selection period.

For example, during a period from time when the selection period is started until time when the actual modulation signal is applied, or during a period from time when application of the modulation signal is completed until time when the selection period is completed, it is possible to dispose predetermined time. Here, it is desirable that a frequency for switching the scanning wiring to which the scanning signal is applied with respect to each selection period is constant during one display refresh period. However, there is no limitation to this. In this regard, however, in that case, each of all selection period during one display refresh period is made to be larger than $((1/Fb)-Tb))/n$.

In passing, in such a structure that screen display is carried out on the basis of an input image signal having a predetermined refresh rate $Fa[Hz]$ by use of a higher frequency $Fb[Hz]$ than $Fa[Hz]$ as a display refresh rate, as a structure for setting the frequency for switching the scanning wiring to which the scanning circuit applies the scanning signal, assuming that Tb which is the number of scanning wirings for scanning n ($n \geq 2$) is set as the non-display period in one display refresh period and is made to be lower than $n/((1/Fb)-Tb)$, specifically, for example, it is possible to preferably adopt a structure for simultaneously applying the scanning signal to two row scanning wirings (a first scanning wiring and a second scanning wiring) in a certain selection period, and for simultaneously applying the scanning signal to two scanning wirings which were shifted by two rows from the scanning wirings to which the scanning signal was applied in a proximate selection period in a subsequent selection period (a third scanning wiring and a fourth scanning wiring: between the third scanning wiring which is the closest scanning wiring to the scanning wiring to which the scanning signal was applied in the proximate selection period, and the first scanning wiring which is a most apart scanning wiring from the scanning wiring to which the scanning signal is applied in this selection period among the scanning wirings to which the scanning signal was applied in the proximate selection period, the second scanning wiring is to be disposed). In passing, as to the number of scanning wirings to which the scanning signal is simultaneously applied, in one selection period, it is not limited to two. Also, there is no necessity that the number of the scanning wirings to which the scanning signal is simultaneously applied is made to be the same in each of successive selection periods.

In passing, to simultaneously apply the scanning signal to a plurality of scanning wirings in a certain selection period is not limited to such a case that both of a front edge and a subsequent edge of the scanning signal which is applied to each of the plurality of the scanning wirings are completely in conformity with each other.

Also, it is possible to particularly preferably adopt a structure which gives an opportunity for applying a modulation signal simultaneously to a plurality of modulation wirings in a selection period. It is possible to preferably adopt a structure which gives an opportunity for applying the modulation signal simultaneously to, in particular, almost all of the modulation wirings, i.e., a structure which carries out line sequential scanning but not pixel interleave scanning. To apply the modulation signal simultaneously to the plurality of modulation wirings is not limited to such a structure that both of a front edge and a rear edge of a plurality of modulation signal which are applied to the plurality of the modulation wirings are completely in conformity with each other.

Also, as to a structure further having a scanning condition determination unit in which the scanning circuit can change a scanning method for carrying out image display on the basis of an instruction signal from the scanning condition determination unit, it is possible to preferably adopt such a structure that at least any one of the number of so-called sub-frames to be divided, configuring one frame period or one field period, the number of scanning wiring to be selected in one scanning unit (one selection period) in each sub-frame period, or a scanning range in which scanning is carried out is determined by the instruction signal which is supplied from the scanning condition determination unit. Here, the scanning field is one which corresponds to a scanning region which is a region including the scanning wiring which becomes an object to be scanned. The number of scanning wirings which become objects to be scanned means such number that the number of scanning wiring which do not become the object to be scanned for carrying out image display is subtracted from the number of scanning wirings which are owned by a display apparatus.

For example, in an image display apparatus having 1000 scanning wirings, in case that there is no scanning wiring which does not become the object to be scanned for image display, the number of effective scanning wirings becomes 1000. Even in case of partially carrying out interlaced scanning, in case that a scanning wiring which was skipped on the occasion of screen display of certain one sheet becomes the object to be scanned, following this screen display or on the occasion of screen display which is carried out adjacently, this skipped scanning wiring is not set as the scanning wiring which does not become the object to be scanned for screen display.

Also, in case of carrying out scanning without setting the scanning wiring in a predetermined area as an object to be selected on the occasion of scanning, for example, there is such a case that scanning is carried out without setting a part of an upper side of, a part of a lower side of, or both of the scanning wiring among the plurality of scanning wirings as the object to be selected. For example, it is such a case that, in an image display apparatus having 1000 scanning wirings, image display is carried out by setting middle 700 scanning wirings as the object to be scanned without setting upper side 150 scanning wirings and lower side 150 scanning wirings as the object to be scanned. At that time, the number of effective scanning wirings becomes 700.

Also, in this invention, preferably, when the input image signal is of a progressive signal with its interlace ratio of 1:1, in order to carry out image display of one frame, one frame period is divided into two sub-frame periods, and in one of the divided sub-frame periods, drive is carried out on the basis of an odd numbered scanning line signal out of drive luminance signals having a one frame scanning line structure, and in another one sub-frame period, a circuit for carrying out drive on the basis of an even numbered scanning line signal is provided.

Also, in this invention, preferably, when the input image signal is of an interlace signal with its interlace ratio of 2:1, in order to carry out image display of one frame, each of even numbered and odd numbered field periods is divided into two sub-frame periods, and in at least one sub-frame period of the divided two sub-frame periods, a circuit for sequentially scanning n pieces of scanning wirings by applying the scanning signal simultaneously to the plurality of scanning wirings is provided.

Also, in this invention, preferably, an input signal discrimination unit for discriminating a type of the input image signal is further provided, and a circuit for determining, on the basis of a discrimination signal from the input signal discrimination unit, the number of sub-frames which the scanning condition determination unit divides one frame period into a plurality of periods, the number of scanning wirings to be selected in one scanning unit of each sub-frame period, and a scanning position of each scanning unit is provided.

In this invention, more preferably, the image display apparatus has a display luminance control unit and a display luminance controlled unit, and has such a circuit that the display luminance control unit variably controls the display luminance controlled unit, in interlock with a scanning condition which is determined by the scanning condition determination unit, in order that light emission luminance of an image display unit becomes a value which is wished.

Also, in this invention, typically, it is possible to configure the image display unit as having an electron-emitting device which emits electrons when a voltage is applied thereto, and a light emitting member which emits light when it received electron beam irradiation from this electron-emitting device. Also, the electron-emitting device may be a surface conduction electron-emitting device.

In the modes for carrying out this invention, a scanning method for having pixels for two scannings emitted light simultaneously in one time scanning unit is adopted. By this, as compared with such a system that a light emitting line with respect to each one scanning is sequentially scanned, it is possible to set each pixel selection time in one frame period two times. On that account, it is possible to make light emission luminance of the display panel 100 approximately two times. Or, even if an amount of each electron emission of pixels is reduced by such a portion that each pixel selection time in one frame period was lengthened, there occurs no change of light emission luminance of the display panel 100.

That is, according to the invention according to the modes for carrying out this invention, without lowering the light emission luminance, it becomes possible to reduce a drive current which flows through the scanning wiring, and it becomes possible to reduce luminance lowering due to voltage drop which occurs on the scanning wiring.

In passing, the image display apparatus of this invention and its drive method are applicable to a display apparatus for displaying an image signal (video signal) such as, for example, a television signal, an image output signal of a computer etc., and so on, and include inventions relating to these.

FIRST EMBODIMENT

Firstly, an image display apparatus according to a first embodiment as a first mode for carrying out this invention will be described. FIG. 1 shows a structure of the image display apparatus according to the fist embodiment of this invention.

As shown in FIG. 1, the display panel 100 is configured by a multiple electron beam source which surface conduction devices are interconnected in a matrix shape of MXN pixels, and a fluorescent screen which emits light when it received irradiation of electron beam which was emitted from this multiple electron beam source.

Also, a high voltage power supply unit 111 is one for applying high voltage bias which becomes an acceleration voltage for accelerating the emitted electron beam to the fluorescent screen.

Also, as described in Patent Document 3, several light emission luminance gray scale control methods for a display panel which used the surface conduction device are conceivable.

In this first embodiment, a modulation wiring drive unit 103 is provided as a modulation circuit for applying a pulse width which is complied with luminance data for defining the light emission amount of each pixel to be inputted to the modulation wiring as a pulse width modulation signal.

On the other hand, a scanning wiring drive unit 104 as a scanning circuit is one for applying a selection voltage pulse of the scanning signal to the scanning wiring to which a display device to be light-emitted is connected, and applying a non-selection voltage to a non-selection scanning wiring (non-selection line), so as to sequentially scan a row to be selected.

And, adopted is a so-called pulse width modulation/line sequential drive system in which, by applying an electric potential difference of an electric potential of a voltage pulse which is the modulation signal and an electric potential of a selection voltage pulse which is the scanning signal to the display device, the device is driven, and by use of the pulse width modulation signal in which a pulse width was modulated, as the modulation signal, image display is carried out.

Also, a Vm power supply unit 108 is a power supply for determining an electric potential of an output voltage pulse of the modulation wiring drive unit 103. Also, a Vss power supply unit 109 is a power-supply for determining an electric potential of a selection voltage pulse which the scanning wiring drive unit 104 outputs. Also, a Vus power supply unit 110 is a power supply for determining an electric potential of the non-selection voltage pulse of an output of the scanning wiring drive unit 104.

Also, the scanning wiring drive unit 104 comprises switch (SW) circuits, the number of which is the same as the number of panel scanning wirings, and a scanning signal generation unit for supplying a scanning signal showing selection and non-selection, to this SW circuit.

And, this scanning wiring drive unit 104 applies a voltage which is supplied from the Vss power supply unit 109 to the scanning wiring of the display panel 100, at the time of selection, and applies a voltage which is supplied from the Vus power supply unit 110 to the scanning wiring of the display panel 100, at the time of non-selection.

Also, an input terminal unit 101 is an input unit for receiving a video signal input from outside. In passing, the input terminal unit 101 is configured including a decode circuit for decoding a compression signal to an original signal by expanding the compression signal, in case that the input video signal is inputted in the compressed form from the original signal, in order to supply a video signal in a restricted transmission band.

Also, the video signal which was inputted to the input terminal unit 101 is supplied to a drive luminance signal generation unit 102 as an image signal generation circuit. In this drive luminance signal generation unit 102, sampling is applied to an image signal from the input terminal unit 101, so as to be in conformity with the number of devices and a pixel structure of the display panel 100. And, from this input image signal, generated is luminance data which corresponds to electron beam emission amount desired value data in each pixels of the display panel 100.

Also, with regard to the number of vertical wirings, in case that the number of effective display scanning wirings of the input video signal differs from the number of scanning wirings (the number of display scanning lines) of the display panel 100, scaling processing such as scanning line interpolation and so on is carried out. And, a drive luminance signal which was in conformity with the number of scanning wirings of the display panel 100 is outputted. This scaling processing ratio is adaptively given by the scanning condition determination unit 107 as a control circuit.

Also, as to the luminance data generated, in order that it can be displayed in synchronous with selection scanning of the scanning wiring to be displayed, luminance data modulation for one modulation is supplied to a modulation wiring drive unit 103 in one selection period.

Here, one line scanning period corresponds to one selection period. And, at the time of starting the selection period, a low level control portion for one clock is disposed, and thereafter, the scanning signal is applied. Also, the modulation wiring drive unit 103 outputs a pulse width modulation signal in such a manner that the pulse width modulation signal is accommodated in one selection period.

Concretely speaking, application of the pulse width modulation signal is started in synchronous with start-up of the selection period. In passing, disposed is a portion in which a signal level of the scanning wiring which was selected at the time of start-up of the selection period becomes a low level, and after that, the scanning signal is applied. On that account, in order that application of the pulse width modulation signal is started together with application of the scanning signal, the pulse width modulation signal is applied with delay of one clock from start-up of the selection period.

Also, there are many cases that an image signal is provided on the assumption of a display apparatus which used a CRT (Cathode Ray Tube). On that account, there are many cases that gamma correction is applied to the image signal, out of consideration of a gamma characteristic which CRT has.

In this connection, in case of intending a display panel whose light emission luminance is almost in proportion to the electron beam emission amount desired value, carried out is so-called inverse gamma correction for canceling out the gamma correction which has been carried out in advance, in the drive luminance signal generation unit 102.

Also, this drive luminance signal generation unit 102 is one for separating a synchronization signal which is contained in the input image signal from the image signal and for supplying it to a timing generation unit 105. This timing generation unit 105 generates a clock signal (CLK signal) necessary for signal processing such as data sampling in the drive luminance signal generation unit 102, luminance data modulation and transfer to the modulation wiring drive unit 103, and so on when the synchronization signal is input from the drive luminance signal generation unit 102. This generated CLK signal is supplied to the drive luminance signal generation unit 102 and the modulation wiring drive unit 103.

Also, the timing generation unit 105 to which the synchronization signal was inputted generates a start trigger signal for scanning wiring selection start-up which is necessary for scanning wiring selection, and a line CLK signal for sequentially switching a selection line, and supplies them to the scanning wiring drive unit 104 as the scanning circuit.

Also, a light emission luminance control unit 106 gives a change to output voltages of the Vss power supply unit 109, or the Vm power supply unit 108 and the Vus power supply unit 110. By this, the light emission luminance control unit 106 controls electron beam emission amount in each pixel of the display panel 100, and as a result, light emission luminance of the display panel 100 is variably controlled.

Also, a scanning condition determination unit 107 is a scanning control unit which is provided for switching a scanning method in one frame period. And, from this scanning condition determination unit 107 to the timing generation unit 105, an instruction signal for determining the number of scannings which are selected simultaneously in one scanning unit (one selection period) and a scanning region of each scanning unit is supplied, so that the scanning wiring drive unit 104 is controlled.

Also, the scanning condition determination unit 107 is configured such that a signal showing scaling processing ratio can be supplied to the drive luminance signal generation unit 102, in such a manner that a scanning condition which was determined and a drive luminance signal to be inputted to the modulation wiring drive unit 103 are in conformity with each other.

Figure 2:
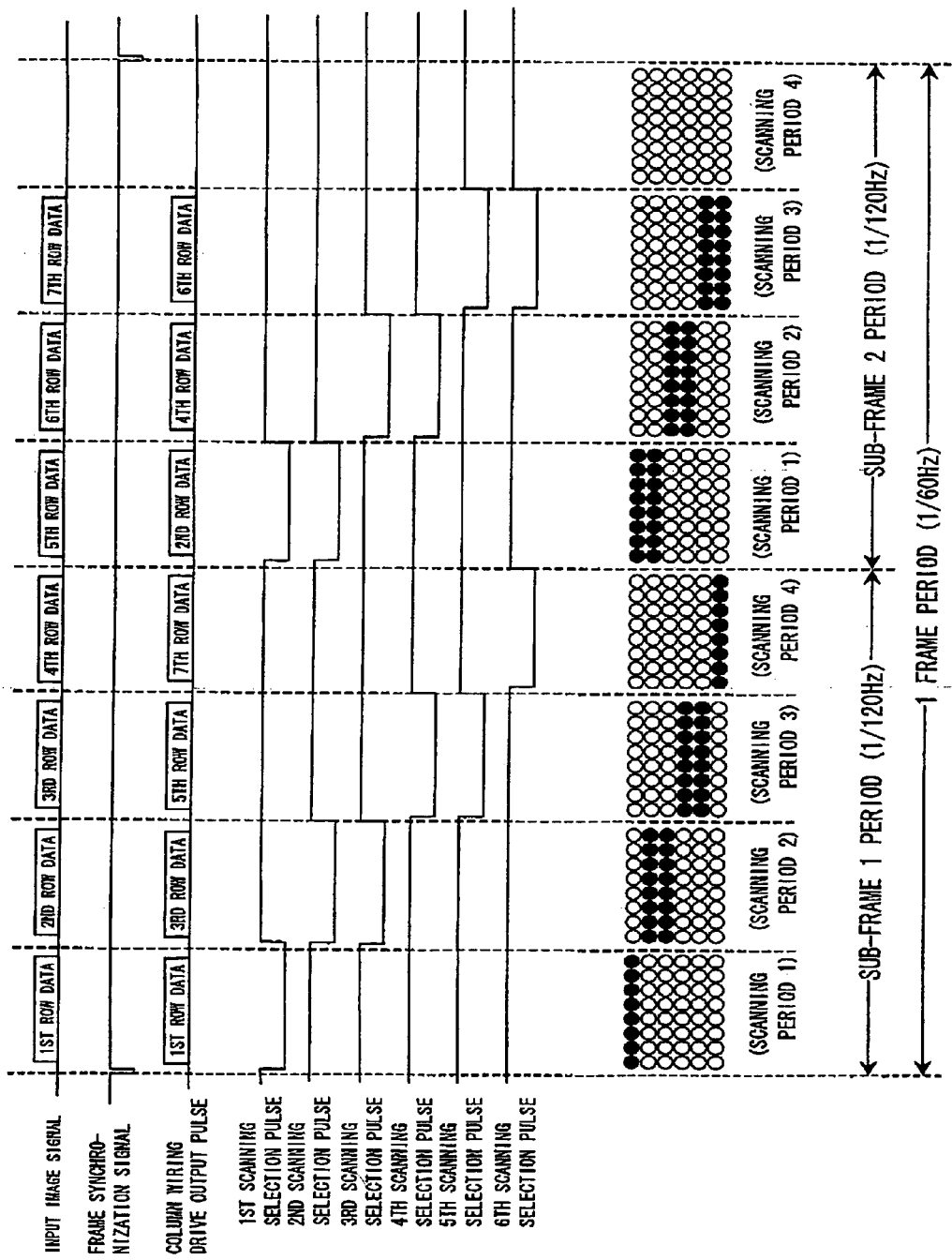
FIG. 2 is a schematic diagram showing scanning wiring scanning sequences in the image display apparatus according to the first mode for carrying out this invention.

Next, a scanning condition of the scanning wiring in the image display apparatus according to this first embodiment which was configured as above will be described. FIG. 2 shows one example of timing in scanning of the scanning wiring according to this first embodiment. In passing, in order to make understand easy, it is assumed that the display panel 100 is configured by pixels which are connected by matrix wirings of 8 columns ×6 rows.

That is, in this first embodiment, the input image signal is inputted in the form of sequential signals for seven scannings, in one frame period in which its refresh rate is a frequency of, e.g., 60 Hz. And, the drive luminance signal generation unit 102 which received this input image signal generates a signal with frequency of 120 Hz which is higher than a frequency of the input image signal, by dividing one frame period into two sub-frames.

And, in an individual sub-frame period, concretely speaking, for example, in a sub-frame 1 period, first, third, fifth, and seventh image signals, and in a sub-frame 2 period, second, fourth, and sixth image signals, are supplied to the modulation wiring drive unit 103, respectively. In passing, division into these sub-frame periods is consistently one example, and it is possible to divide more than this division.

Also, each sub-frame is divided into four scanning periods as a plurality of selection periods, and each sub-frame and a display sequence of each scanning period are defined as follows. In passing, a pixel as described below is one which is formed by a display device being driven, and concretely speaking, image display is carried out by use of a luminescent spot which is formed by each display device emitting light as the pixel.

<First Sub-Frame>

Firstly, in a first sub-frame, a first scanning period (a period which is shown as a scanning period 1 in the sub-frame 1 period, in FIG. 2 (hereinafter, shown in the same manner)) outputs a modulation wiring drive pulse electric potential which corresponds to first row luminance data to each scanning wiring, gives a selection electric potential which is the scanning signal to a first row scanning wiring, and gives the opportunity of light emission to a first row pixel.

Also, a second scanning period outputs a modulation wiring drive pulse electric potential which corresponds to third row luminance data to each scanning wiring, gives a selection electric potential to second and third row scanning wirings, and gives the opportunity of light emission to second and third row pixels.

Also, a third scanning period outputs a modulation wiring drive pulse electric potential which corresponds to fifth row luminance data to each scanning wiring, gives a selection electric potential to fourth and fifth row scanning wirings, and gives the opportunity of light emission to fourth and fifth row pixels.

Also, a fourth scanning period outputs a modulation wiring drive pulse electric potential which corresponds to seventh row luminance data to each scanning wiring, gives a selection electric potential to a sixth row scanning wiring, and gives the opportunity of light emission to a sixth row pixel.

<Second Sub-Frame>

Also, in a second sub-frame, firstly, as to the first scanning period, a modulation wiring drive pulse electric potential which corresponds to second row luminance data is outputted to each scanning wiring, and a selection electric potential is given to first and second row scanning wirings, and the opportunity of light emission is given to first and second row pixels.

Also, in the second scanning period, a modulation wiring drive pulse electric potential which corresponds to fourth row luminance data is outputted to each scanning wiring, and the selection electric potential is given to third and fourth row scanning wiring, and the opportunity of light emission is given to third and fourth row pixels.

Also, in the third scanning period, a modulation wiring drive pulse electric potential which corresponds to sixth row luminance data is outputted to each scanning wiring, and the selection electric potential is given to fifth and sixth row scanning wiring, and the opportunity of light emission is given to fifth and sixth row pixels. Also, the fourth scanning period is assigned to a non-display period.

In passing, in an example shown in FIG. 2, shown is such an example that the input image signal and scanning selection scanning are synchronous with each other by a frame synchronization signal, but there is no necessity of being necessarily synchronized.

As described above, in this first embodiment, by such a structure that one frame is divided into two sub-frames, and scanning wiring selection is carried out with respect to each sub-frame, without any change of a frame frequency for image display, it is possible to make it an integral multiple frequency of a sub-frame frequency, e.g., a double frequency thereof, and therefore, it is possible to have it corresponded to such a fact that a refresh rate for screen display was speeded up to an integral multiple thereof, e.g., two times, and it is possible to realize improvement of flicker disturbance due to the refresh rate of the input image signal.

Figure 6:
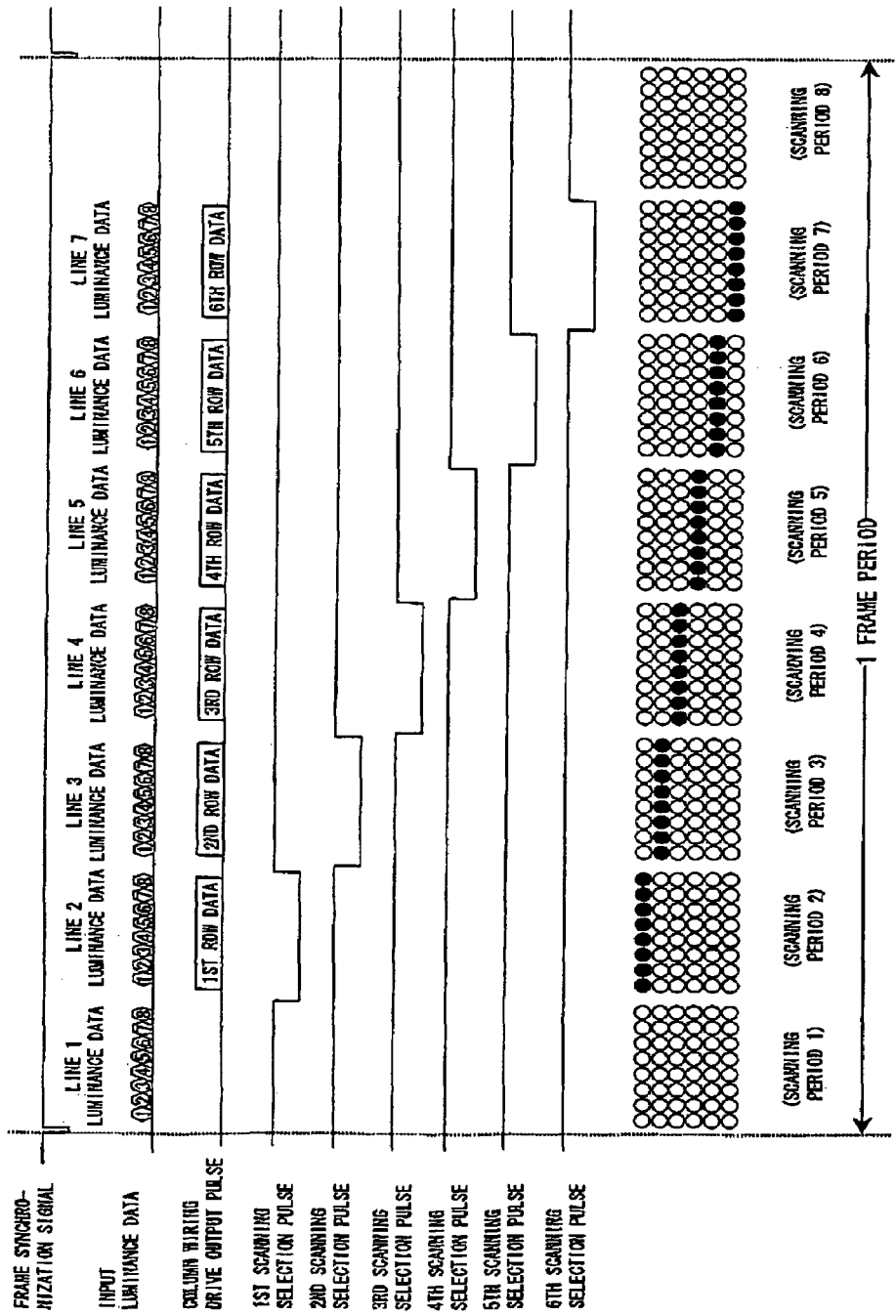
FIG. 6 is a view showing scanning wiring scanning sequences according to a conventional technology.

Also, according to this first embodiment, in addition to division into two sub-frame periods and increase twice of a screen display frequency, two scanning wiring simultaneous selection drive is carried out, and thereby, since the number of times that the scanning wiring in one frame period is scanned and selected is maintained, it is possible to make a scanning wiring selection frequency the same as in a driving method shown in FIG. 6.

Figure 7:
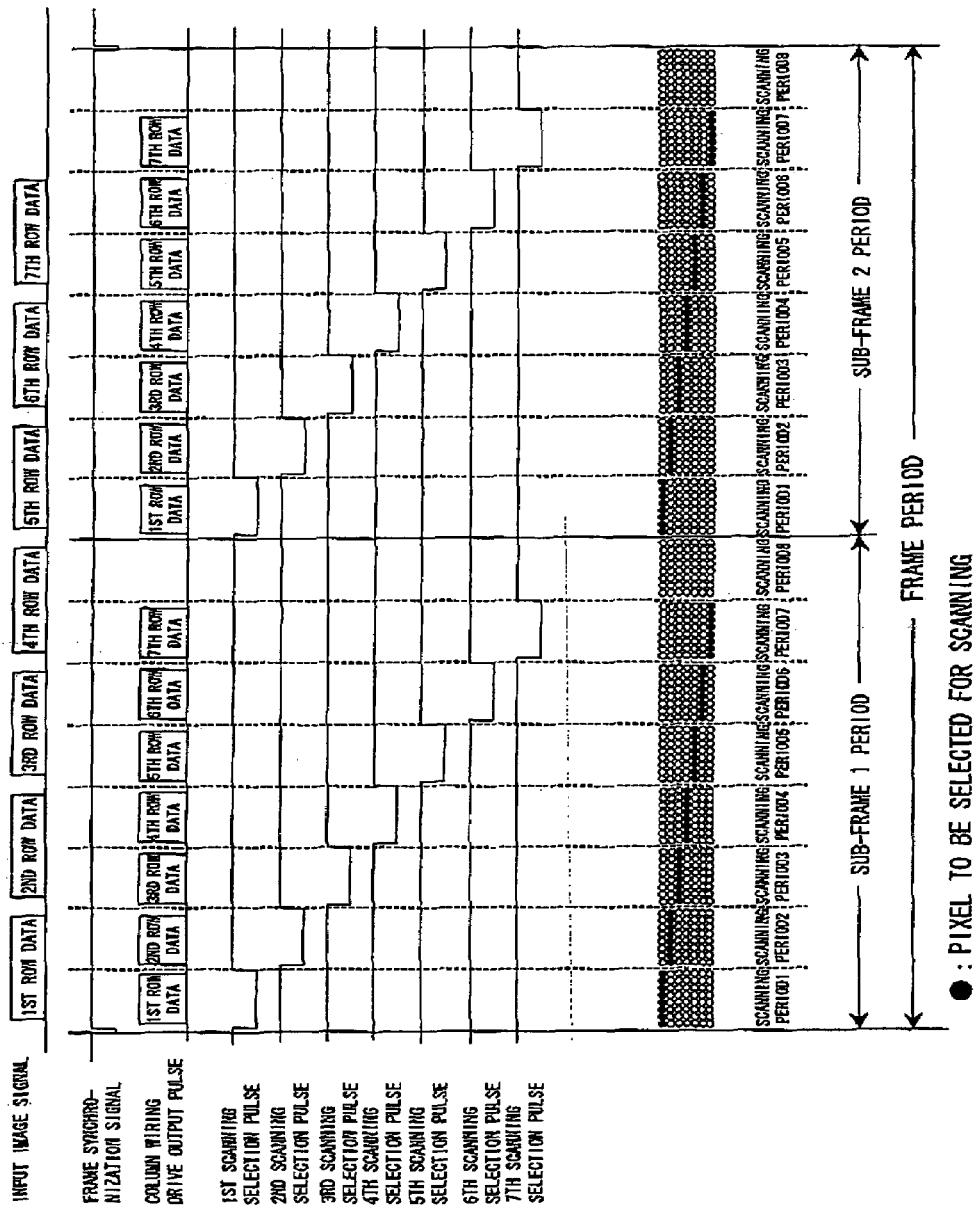
FIG. 7 is a view showing scanning wiring scanning sequences according to a conventional technology.

In an example of high frame making drive shown in FIG. 7, when the surface display frequency is raised to two times, the scanning wiring selection frequency also results in becoming two times. This means that there is a necessity of carrying out data transfer to the modulation drive unit for half time, and in order to realize this, operating frequencies of the drive luminance signal generation unit 102 and the modulation wiring drive unit 103 had to be speeded up to two times. On that account, in case that the display panel was made to be of high definition, it is impossible to be realized from a restriction of an operating frequency, whereas by adopting a drive system according to this first embodiment, it is possible to increase the screen display frequency to two times over suppressing increase of the operating frequency.

SECOND EMBODIMENT

Figure 3:
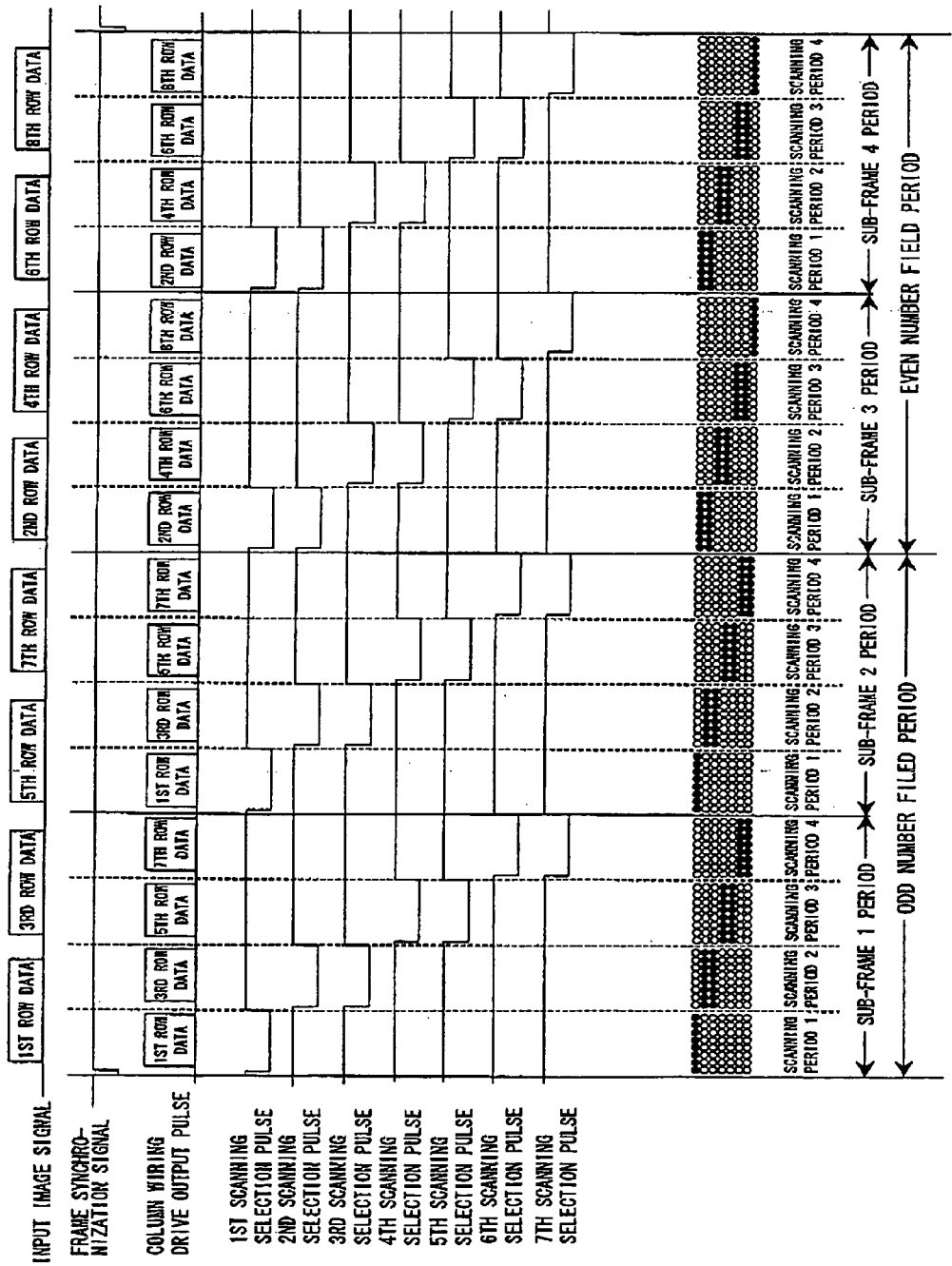
FIG. 3 is a schematic diagram showing scanning wiring scanning sequences in the image display apparatus according to a second mode-for-carrying out this invention.

Next, a second embodiment as a second mode for carrying out this invention will be described. FIG. 3 shows one example of timing in scanning of the scanning wiring according to this second embodiment. In passing, in order to make understanding easy, it is assumed that the display panel 100 is configured by pixels which are connected by matrix wirings of 8 columns×7 rows. In passing, since an image display apparatus according to this second embodiment has the same structure as in the first embodiment, description thereof will be omitted.

The first embodiment is one which received the input image signal which is called as a so-called progressive signal and realizes high frame making drive, whereas this second embodiment is one which receives an interlace signal as the input image signal, and has a frequency of a field comprising odd numbered and even numbered fields as an input refresh rate, and drives by speeding up the refresh rate to two times.

That is, in this second embodiment, as an input image, an image signal which corresponds to first, third, fifth and seventh row odd numbered lines is inputted to an odd numbered field, and an image signal which corresponds to second, fourth, sixth and eighth row even numbered line is inputted to an even numbered field.

Also, in scanning wiring selection scanning according to this second embodiment, the odd numbered field period is divided into tow sub-frames of a sub-frame 1 period and a sub-frame 2 period, and the even numbered field period is divided into two sub-frames of a sub-frame 3 period and a sub-frame 4 period.

And, in addition to dividing each into sub-frame periods, by scanning selection speed which is twice of an input line frequency, two rows at a time are selected simultaneously and the scanning wiring selection scanning is carried out.

That is, firstly, in the sub-frame 1 period and the sub-frame 2 period, the first scanning period outputs the modulation wiring drive pulse electric potential which corresponds to first row luminance data to each scanning wiring, and gives the selection electric potential to the first row scanning wiring, and gives the opportunity of light emission of the first row pixel.

Also, in the second scanning period, the modulation wiring drive pulse electric potential which corresponds to the third row luminance data is outputted to each scanning wiring, and the selection electric potential is given to the second and third row scanning wiring, and the opportunity of light emission is given to the second and third row pixels.

Also, in the third scanning period, the modulation wiring drive pulse electric potential which corresponds to the fifth row luminance data is outputted to each scanning wiring, and the selection electric potential is given to the fourth and fifth row scanning wiring, and the opportunity of light emission is given to the fourth and fifth row pixels.

Also, in the fourth scanning period, the modulation wiring drive pulse electric potential which corresponds to the seventh row luminance data is outputted to each scanning wiring, and the selection electric potential is given to the sixth and seventh row scanning wiring, and the opportunity of light emission is given to the sixth row pixel.

Also, the sub-frame 3 period and the sub-frame 4 period, in the first scanning period, outputs the modulation wiring drive pulse electric potential which corresponds to the second row luminance data to each scanning wiring, and gives the selection electric potential to the first and second row scanning wirings, and gives the opportunity of light emission to the first and second row pixels.

Also, in the second scanning period, the modulation wiring drive pulse electric potential which corresponds to the fourth row luminance data is outputted to each scanning wiring, and the selection electric potential is given to the third and fourth row scanning wirings, and the opportunity of light emission is given to the third and fourth row pixels.

Also, in the third scanning period, the modulation wiring drive pulse electric potential which corresponds to the sixth row luminance data is outputted to each scanning wiring, and the selection electric potential is given to the fifth and sixth row scanning wirings, and the opportunity of light emission is given to the fifth and sixth row pixels.

Also, in the fourth scanning period, the modulation wiring drive pulse electric potential which corresponds to the eighth row luminance data is outputted to each scanning wiring, and the selection electric potential is given to the seventh row scanning wiring, and the opportunity of light emission is given to the seventh row pixel.

In the above-described example, described was an example of such a scanning method that each of input even and odd field periods is divided into two sub-frame periods, and in one time scanning unit, pixels for two rows are made to emit light simultaneously, but the number of sub-frame division and the number of rows which are made to emit light simultaneously are not necessarily limited to this, and it is possible to adopt various values.

According to this second embodiment, by such a structure that one field period is divided into two sub-frames, and scanning wiring selection is carried out with respect to each sub-frame, the frame frequency for image display does not change, but a sub-frame frequency is twice of a field frequency, and therefore, it corresponds to such a fact that the refresh rate for screen display was speeded up to two times, and it is possible to improve the flicker disturbance due to the refresh rate of the input signal.

Also, by adopting the scanning method for having pixels for two scannings emitted light simultaneously in one time scanning unit, as compared with a conventional method for sequentially scanning a light emission line with respect to each one scanning, it is possible to set each pixel selection time in one frame period to double length. On that account, it is possible to make light emission luminance of the display panel 100 to approximately two times.

Also, since each pixel selection time in one frame period is lengthened, in also case that electron emission amount in each pixel was reduced, it is possible to maintain the light emission luminance of the display panel 100.

That is, according to this second embodiment, without lowering the light emission luminance, it becomes possible to reduce a drive current which flows through the scanning wiring, and it becomes possible to reduce luminance lowering due to voltage drop which occurs on the scanning wiring.

Also, in a conventional technology, in case of displaying an interlace signal in an image display apparatus which used a matrix panel, after it was converted to a progressive signal having a double line frequency, there was a necessity of carrying out the line sequential scanning one scanning at a time with double scanning speed for display, whereas, in this second embodiment, the scanning wiring selection is carried out with double scanning selection speed, but this scanning speed is equivalent to scanning speed at the time of receiving a conventional progressive signal. On that account, there occurs no case of worrying about operating frequency increase of the drive luminance signal generation unit 102 and the modulation wiring drive unit 103.

THIRD EMBODIMENT

Figure 4:
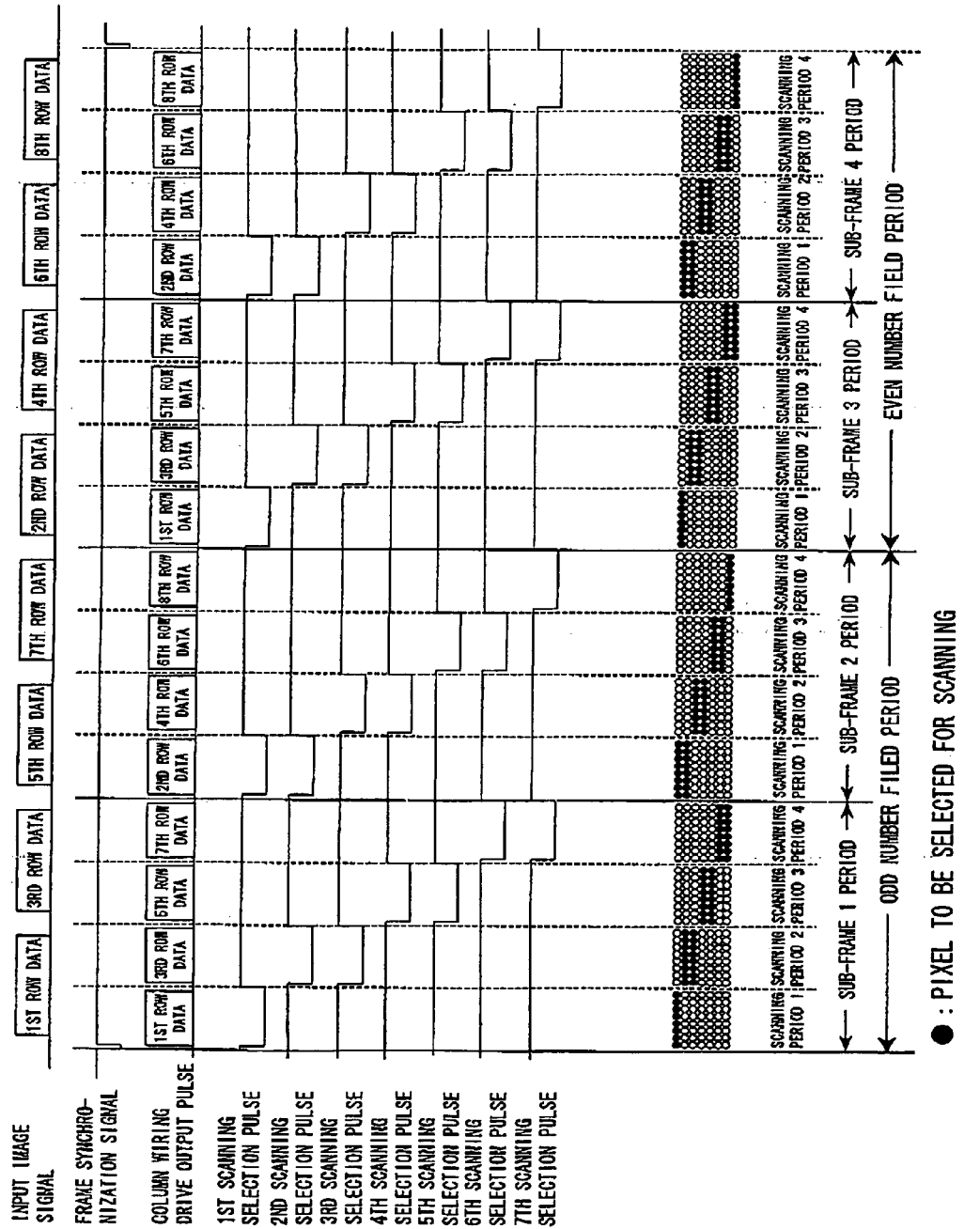
FIG. 4 is a schematic diagram showing scanning wiring scanning sequences in the image display apparatus according to a third mode for carrying out this invention.

Next, a third embodiment as a third mode for carrying out this invention will be described. FIG. 4 shows one example of timing in scanning of the scanning wiring according to this third embodiment. In passing, in order to make understanding easy, it is assumed that the display panel 100 is configured by pixels which are connected by matrix wirings of 8 columns×7 rows. In passing, since an image display apparatus according to this third embodiment has the same structure as in the first embodiment, description thereof will be omitted.

As shown in FIG. 4, in this third embodiment., unlike in the second embodiment, in two sub-frame periods of the sub-frame 1 period and the sub-frame 2 period, different scanning wiring selections are carried out. Also, in two sub-frame period of the sub-frame 3 period and the sub-frame 4 period, in the two sub-frame period, different scanning wiring selections are carried out.

That is, in the first scanning periods in the sub-frame 1 period of the odd numbered field periods and the sub-frame 3 period of the even numbered field periods, the modulation wiring drive pulse electric potential which corresponds to the first row luminance data is outputted to each scanning wiring, and the selection electric potential is given to the first row scanning wiring, and the opportunity of light emission is given to the first row pixel.

Also, in the second scanning period, the modulation wiring drive pulse electric potential which corresponds to the third row luminance data is outputted to each scanning wiring, and the selection electric potential is given to the second and third row scanning wirings, and the opportunity of light emission is given to the second and third row pixels.

Also, in the third scanning period, the modulation wiring drive pulse electric potential which corresponds to the fifth row luminance data is outputted to each scanning wiring, and the selection electric potential is given to the fourth and fifth row scanning wirings, and the opportunity of light emission is given to the fourth and fifth row pixels.

Also, in the fourth scanning period, the modulation wiring drive pulse electric potential which corresponds to the seventh row luminance data is outputted to each scanning wiring, and the selection electric potential is given to the sixth and seventh row scanning wirings, and the opportunity of light emission is given to the sixth row pixel.

On the other hand, in the first scanning periods in the sub-frame 2 period of the odd numbered field periods and the sub-frame 4 period of the even numbered field periods, the modulation wiring drive pulse electric potential which corresponds to the second row luminance data is outputted to each scanning wiring, and the selection electric potential is given to the first and second row scanning wirings, and the opportunity of light emission is given to the first and second row pixels.

Also, in the second scanning period, the modulation wiring drive pulse electric potential which corresponds to the fourth row luminance data is outputted to each scanning wiring, and the selection electric potential is given to the third and fourth row scanning wirings, and the opportunity of light emission is given to the third and fourth row pixels.

Also, in the third scanning period, the modulation wiring drive pulse electric potential which corresponds to the sixth row luminance data is outputted to each scanning wiring, and the selection electric potential is given to the fifth and sixth row scanning wirings, and the opportunity of light emission is given to the fifth and sixth row pixels.

Also, in the fourth scanning period, the modulation wiring drive pulse electric potential which corresponds to the eighth row luminance data is outputted to each scanning wiring, and the selection electric potential is given to the seventh row scanning wiring, and the opportunity of light emission is given to the seventh row pixel.

In passing, in the above-described example, described was an example of such a scanning method that each of input even and odd field periods is divided into two sub-frame periods, and in one time scanning unit, pixels corresponding to 2 scanning wirings are made to emit light simultaneously, but the number of sub-frame division and the number of scanning wirings which gives the opportunity of light emission simultaneously are not necessarily limited to this, and it is possible to adopt various values.

As described above, in this third embodiment, by such a structure that one field period is divided into two sub-frames and scanning wiring selection is carried out with respect to each sub-frame, the frame frequency for image display does not change, but a sub-frame frequency is twice of a field frequency. On that account, it corresponds to such a fact that the refresh rate for screen display was speeded up to two times, and it is possible to improve the flicker disturbance due to the refresh rate of the input signal.

Also, by adopting the scanning method for having pixels for two scannings emitted light in one time scanning unit, as compared with a conventional method for sequentially scanning a light emission line with respect to each one scanning, it is possible to set each pixel selection time in one frame period to double length and therefore, it is possible to make light emission luminance of the display panel 100 to approximately two times.

Also, according to this third embodiment, by just that each pixel selection time in one frame period was lengthened, even if the electron emission amount in each pixel is reduced, the light emission luminance of the display panel 100 does not change. That is, without lowering the light emission luminance, it becomes possible to reduce the drive current which flows through the scanning wiring, and it becomes possible to reduce luminance lowering due to voltage drop which occurs on the scanning wiring.

Also, in a conventional technology, in case of displaying an interlace signal in an image display apparatus which used a matrix panel, after it was converted to a progressive signal having a double line frequency, it was displayed by carrying out the line sequential scanning with one scanning at a time by double scanning speed. In contrast to this, in this third embodiment, the scanning wiring selection is carried out by for example, double scanning selection speed, but with respect to scanning speed, it is possible to maintain the same speed as the scanning speed at the time of receiving the conventional progressive signal. On that account, it is possible to obtain such an advantage that there is no necessity of worrying about operating frequency increase of the drive luminance signal generation unit 102 and the modulation wiring drive unit 103.

FOURTH EMBODIMENT

Figure 5:
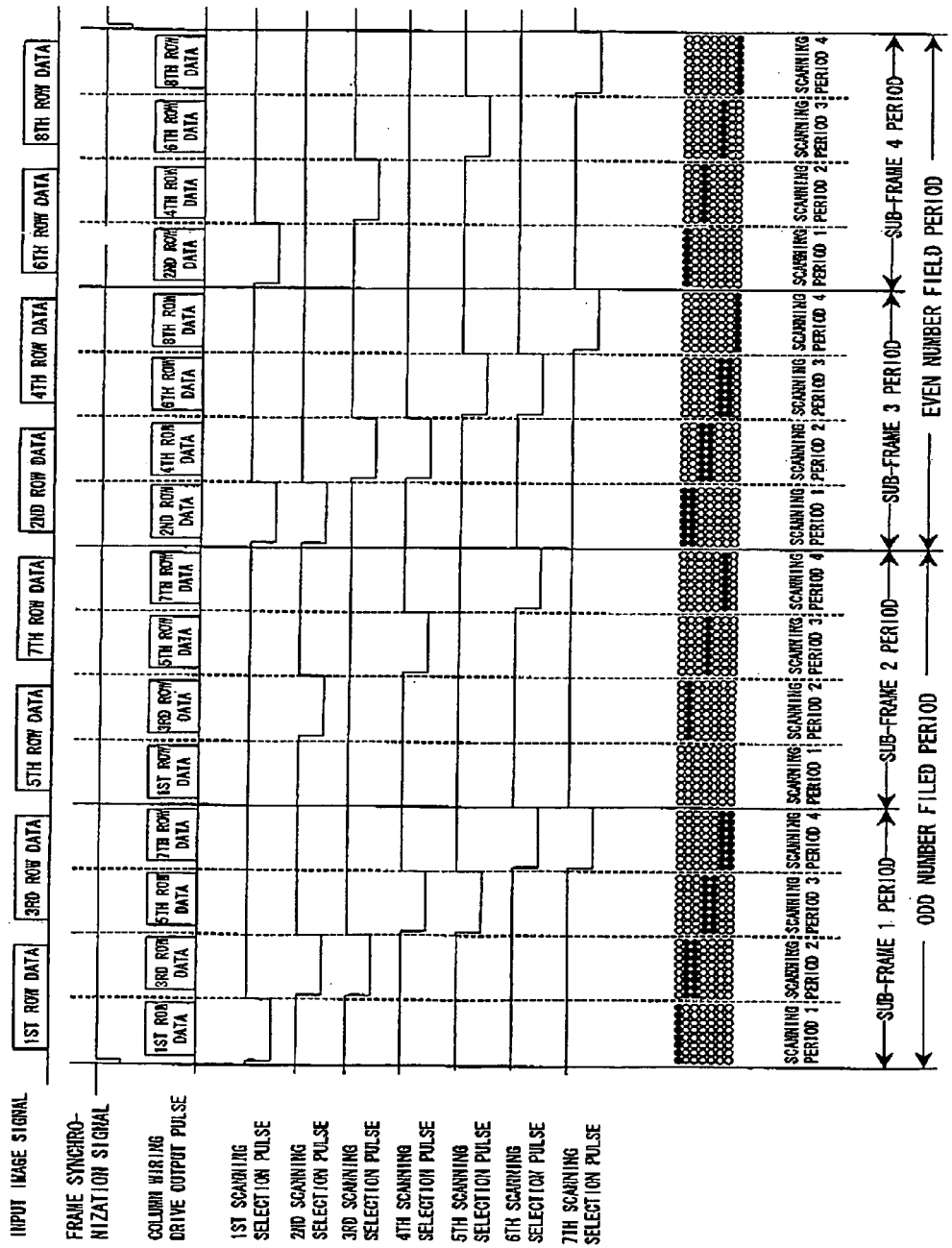
FIG. 5 is a schematic diagram showing scanning wiring scanning sequences in the image display apparatus according to a fourth mode for carrying out this invention.

Next, a fourth embodiment as a fourth mode for carrying out this invention will be described. FIG. 5 shows a structural example according to this fourth embodiment. In passing, since this fourth embodiment is a modification of the above-described second embodiment, and with respect to a structure of an image display apparatus, it is the same as in the first embodiment, description thereof will be omitted.

That is, in the above-described second embodiment, in two sub-frames of the sub-frame 1 period and the sub-frame 2 period, or the sub-frame 3 period and the sub-frame 4 period, the scanning wiring selection was carried out so as to give the same luminance data to the same scanning. In contrast to this, in this fourth embodiment, it is designed such that scanning wiring selections which are different from each other are carried out, in the two sub-frame periods of the field period. FIG. 5 shows a view representing timing according to this fourth embodiment.

That is, as shown in FIG. 5, in the sub-frame 1 period of the odd numbered field period and the sub-frame 3 period of the even numbered field period, scanning wiring selection for selecting two scannings simultaneously in one scanning period is carried out. In contrast to this, in the sub-frame 2 period of the odd numbered field period and the sub-frame 4 period of the even number field period, it is designed such that one scanning selection is carried out in one scanning period, and in a next scanning period, scanning wiring selection with one scanning skipped is carried out.

According to this fourth embodiment, by use of such a structure that one field period is divided into two sub-frames and scanning wiring selection is carried out with respect to each sub-frame, it is possible to obtain the same advantage as in the first embodiment, and because of such a fact that there exists half of sub-frames which adopted the scanning method for having pixels for two scannings emitted light simultaneously in one time scanning unit, as compared to a conventional system for sequentially scanning the light emission lines with respect to each one scanning, it is possible to set each pixel selection time in one frame period to length of 1.5 times. On that account, it is possible to make the light emission luminance of the display panel 100 to approximately 1.5 times.

Also, according to this fourth embodiment, by just that each pixel selection time in one frame period was lengthened, even if the electron emission amount in each pixel is reduced, it is possible to realize such a situation that the light emission luminance of the display panel 100 does not change. That is, without lowering the light emission luminance, it becomes possible to reduce the drive current which flows through the scanning wiring. By this, it becomes possible to reduce luminance lowering due to voltage drop which occurs on the scanning wiring.

Further, according to this fourth embodiment, by use of such a structure that one of the sub-frames is made to be of two scanning simultaneous selection, and the other one sub-frame is selectively scanned at every one scanning by skipping one scanning, as compared with such a case that all is of two scanning simultaneous selection, it is possible to obtain a high vertical resolution characteristic.

FIFTH EMBODIMENT

Next, a fifth embodiment as a fifth mode for carrying out this invention will be described. In passing, as to a structure of an image display apparatus, since it is the same as in the first embodiment, description thereof will be omitted.

Also, in this fifth embodiment, the number of scanning conditions and scanning sequences at the time of each scanning condition should be determined on the basis a format of an image signal which is inputted to an image display apparatus and the number of pixels of a display panel of the image display apparatus and user's preference.

That is, for example, an image display apparatus for receiving four type formats of 525*i*, 525*p*, 1125*i*, and 750*p* in BS digital broadcasting will be considered as an example. It is assumed that this image display apparatus is one which uses a panel having the number of pixels which are in conformity with so-called high definition broadcasting such as 1125*i* and 750*p*.

In this fifth embodiment, which one of 525*i*, 525*p*, 1125*i*, and 750*p* is an image signal to be inputted is discriminated by the scanning condition determination unit 107, and in accordance with an input signal format, a scanning switching signal of two bits is outputted as follows.

In case of 525*i*: a scanning switching signal (H. H) is outputted.

In case of 525*p*: a scanning switching signal (H. L) is outputted.

In case of 1125*i*: a scanning switching signal (L, H) is outputted.

In case of 750*p*: a scanning switching signal (L, L) is outputted.

That is, the timing generation unit 105 is equipped with four type scanning conditions which are determined in advance to the above-described input signal of 525*i*, 525*p*, 1125*i*, and 750*p*, i.e., the number of simultaneous selection scannings in one scanning unit and the number of overlapped scannings in each scanning unit, and in accordance with the scanning switching signal of two bits which corresponds to an input image format discrimination result, it is switched.

Also, as to scanning line conversion processing of the drive luminance signal generation unit 102, in the same manner, it is equipped with four type scanning line conversion conditions which are determined in advance to the above-described input signal of 525*i*, 525*p*, 1125*i* and 750*p*, and in accordance with the scanning switching signal of two bits which corresponds to an input image format discrimination result, it is switched.

In this manner, the input image signal is discriminated by the scanning condition determination unit 107, and in accordance with this discrimination result, the drive luminance signal generation unit 102 and the timing generation unit 105 are controlled. By this, when a progressive signal was inputted, the same scanning as in the first embodiment is carried out. Also, when an interlace signal was inputted, the same scanning as in the second embodiment is carried out, and in this manner, it is possible to select a scanning method which is suitable for an input signal.

Also, by such a structure that the scanning condition determination unit 107 can receive a scanning condition switching request from a user interface circuit (not shown) such as for example, a remote controller and so on, it becomes possible to determine a scanning condition which corresponds to user's preference. In passing, with regard to the scanning condition, it is not limited to the above-described ones, and it is possible to take various scanning conditions.

SIXTH EMBODIMENT

Next, a six embodiment as a sixth mode for carrying out this invention will be described. In this sixth embodiment, such an example that the scanning condition determination unit 107 switches the scanning conditions in response to display luminance will be described.

For example, in such an image display apparatus that a luminance variable scope according to adjustment of a user is 25%~200%, in order to come resolution first to luminance variable control of 25%~100%, luminance control is carried out by use of such a method that a scanning condition for sequentially scanning one row at a time is selected, and for example a drive voltage is controlled, and to the luminance scope of 100%~200%, drive which corresponds to the first embodiment is carried out and the number of simultaneous selection scannings and a scanning unit position are selected so as for the luminance to become twice, and a drive voltage is controlled in an interlocked manner so as to be able to obtain desired luminance.

As above, by combining a brightness adjustment circuit and scanning condition selection, as compared with a conventional technology, it becomes possible to realize brightness adjustment with wider scope. In passing, as an example of the brightness adjustment, drive voltage control was explained, but it is not necessarily limited to drive voltage control, and concretely speaking, for example, it is possible to control contrast of a drive luminance signal, and to control an acceleration voltage of an electron beam which is emitted from an electron source.

Also, in the above-described sixth embodiment, shown was such an example that the display luminance is determined by a user's adjustment, but there is also such a case that this display luminance is determined in accordance with an input signal.

That is, at the time of having received the high definition broadcasting such as the above-described 1125i and 750p and in case of having received a computer signal and so on, the scanning condition for sequentially scanning one scanning at a time in such a manner that display quality comes first than the display luminance is selected, and in case of such a signal like 525i that resolution of the input image signal is not relatively high, it is also possible to determine the scanning condition for having the brightness come first. Furthermore, the scanning condition may be determined adaptively from both information of the display luminance and the input signal, and it is also possible to determine the scanning condition directly by a user of the image display apparatus.

As described above, according to each mode for carrying out this invention, without increasing an operating frequency of an internal circuit, it becomes possible to carry out screen display by a display refresh rate which is higher than a refresh rate of an input image signal, and it is possible to improve flicker disturbance due to the refresh rate of the input signal, over suppressing increase of cost. Also, according to the structures of the above-described embodiments, as compared with a conventional technology, it becomes possible to assure a condition for realizing more advanced high luminance of an image display apparatus.

Also, as described above, in order to obtain the same luminance without realizing improvement of luminance, by an application for reducing an electron emission amount of each pixel, it becomes possible to reduce a drive current which flows through a scanning wiring with maintaining light emission luminance, and it is possible to obtain a condition for reducing luminance lowering due to voltage drop which occurs on the scanning wiring.

Also, by having various scanning conditions, in accordance with an input image signal type and a user's request, it is possible to adaptively control display quality or display luminance, and therefore, it is possible to realize an image display apparatus in which a user's usability was improved.

As above, the modes for carrying out this invention were concretely described, but this invention is not limited to the above-described embodiments, and modifications of various types on the basis of the technical idea of this invention are possible.

For example, numerical values, scanning conditions, and the number of matrixes which were cited in the above-described embodiments are absolutely examples, and according to need, numerical values, scanning conditions, and the number of matrixes which are different from these may be used.

Also, according to the invention which relates to this application, flicker disturbance is reduced, and it is possible to suppress cost increase which comes up with this-flicker disturbance, and it is possible to carry out display with high display refresh rate at low cost. Also, in a display apparatus which used a panel of a big screen and high definition, it is possible to realize high frame rate making drive, and it is possible to realize improvement of luminance.

As described above, according to the invention which relates to this application, it is possible to carry out drive with high refresh rate preferably.

What is claimed is:

1. An image display apparatus composing:
   a plurality of display devices;
   a plurality of scanning wirings forming a matrix wiring for driving said plurality of display devices;
   a plurality of modulation wirings forming the matrix wiring for driving said plurality of display devices;
   a scanning circuit for applying a scanning signal to said scanning wirings and which sequentially switches said scanning wirings to which the scanning signal is applied with respect to each selection period;
   an image signal generation circuit for generating an image signal for carrying out screen display with a frequency Fb[Hz] as a display refresh rate, based on an input image signal having a predetermined refresh rate Fa[Hz], wherein the frequency Fb[Hz] is higher than Fa[Hz]; and
   a modulation circuit for applying a modulation signal which is based upon said image signal to said display device which is connected to said scanning wiring to which the scanning signal was applied, through said modulation wiring,
   wherein said scanning circuit is capable of switching between a first scanning condition in which said scanning circuit selects one scanning wiring at a time and a second scanning condition in which said scanning circuit selects more than one scanning wiring simultaneously,
   wherein, in the second scanning condition, the scanning signal is applied to said plurality of scanning wirings in one selection period, in such a manner that a frequency for switching said scanning wiring to which said scanning circuit applied the scanning signal becomes smaller than $n/((1/Fb)-Tb)$, assuming that n ($n \geq 2$) is the number of the scanning wirings for scanning, Tb is a non-display period in one display refresh period.

2. The image display apparatus according to claim 1, further comprising a scanning condition determination unit, wherein said scanning circuit is configured in such a manner that a scanning method for carrying out image display on the basis of an instruction signal from said scanning condition determination unit can be changed.

3. The image display apparatus according to claim 2, wherein the image signal which said image signal generation circuit supplies to said modulation circuit in response to the instruction signal from said scanning condition determination unit is generated so as to be in conformity with a scanning method which was determined by said scanning condition determination unit.

4. The image display apparatus according to claim 2, further comprising:
   a circuit for generating a display luminance desired value; and
   a circuit for determining, on the basis of said display luminance desired value, the number of sub-frames when said scanning condition determination unit divides one frame period into a plurality of periods, the number of scanning wirings which are selected in one scanning unit of each sub-frame period, and a scanning region of each scanning unit.

5. The image display apparatus according to claim 2, further comprising:
   an input signal discrimination unit for discriminating a type of an input image signal;
   a circuit for generating a display luminance desired value; and
   a circuit for determining, on the basis of a discrimination signal from said input signal discrimination unit and said display luminance desired value, the number of sub-frames which said scanning condition determination unit divides one frame period into a plurality of periods, the number of scanning wirings which are selected in one scanning unit of each sub-frame period, and a scanning position of each scanning unit.

6. The image display apparatus according to claim 1, further comprising:
   a circuit for varying a scanning electric potential to be applied to said scanning wiring; and
   a circuit for carrying out display luminance control by varying at least said scanning electric potential.

7. The image display apparatus according to claim 1, wherein
   when it is assumed that at least one scanning wiring to which the scanning signal is applied by said scanning circuit in a previous selection period in successive two selection periods is set as a previous scanning wiring and at least one scanning wiring to which the scanning signal is applied by said scanning circuit in a subsequent selection period in successive two selection periods is set as a subsequent scanning wiring,
   said scanning is carried out in such a manner that at least one scanning wiring is disposed between a previous scanning wiring which is most apart from said subsequent scanning wiring out of at least one said scanning wiring and a subsequent scanning wiring which is the closest to said previous scanning wiring out of at least one said subsequent scanning wiring.

8. An image display apparatus according to claim 1, wherein said scanning circuit switches between the first scanning condition and the second scanning condition according to desired display luminance.

9. An image display apparatus according to claim 8, wherein the desired display luminance is determined by a user's adjustment.

* * * * *

UNITED STATES PATENT AND TRADEMARK OFFICE
CERTIFICATE OF CORRECTION

PATENT NO. : 7,268,751 B2
APPLICATION NO. : 10/756451
DATED : September 11, 2007
INVENTOR(S) : Tatsuro Yamazaki et al.

It is certified that error appears in the above-identified patent and that said Letters Patent is hereby corrected as shown below:

COLUMN 10:

Line 2, "in synchronous" should read --synchronously--.
    Line 14, "in synchronous" should read --synchronously--.

COLUMN 13:

Line 29, "tow" should read --two--.

COLUMN 15:

Line 16, "embodiment.," should read --embodiment,--.

COLUMN 20:

Line 8, "this-flicker" should read --this flicker--.

Signed and Sealed this

Third Day of February, 2009

JOHN DOLL
*Acting Director of the United States Patent and Trademark Office*